3,434,917
PREPARATION OF VERMICULITE PAPER
John W. Kraus, Fairfax, Va., and Forrest R. Hurley, Ellicott City, Md., assignors to W. R. Grace & Co., New York, N.Y., a corporation of Connecticut
Filed Mar. 7, 1966, Ser. No. 532,363
Int. Cl. C03c 25/00; C03b 37/00
U.S. Cl. 162—3                9 Claims

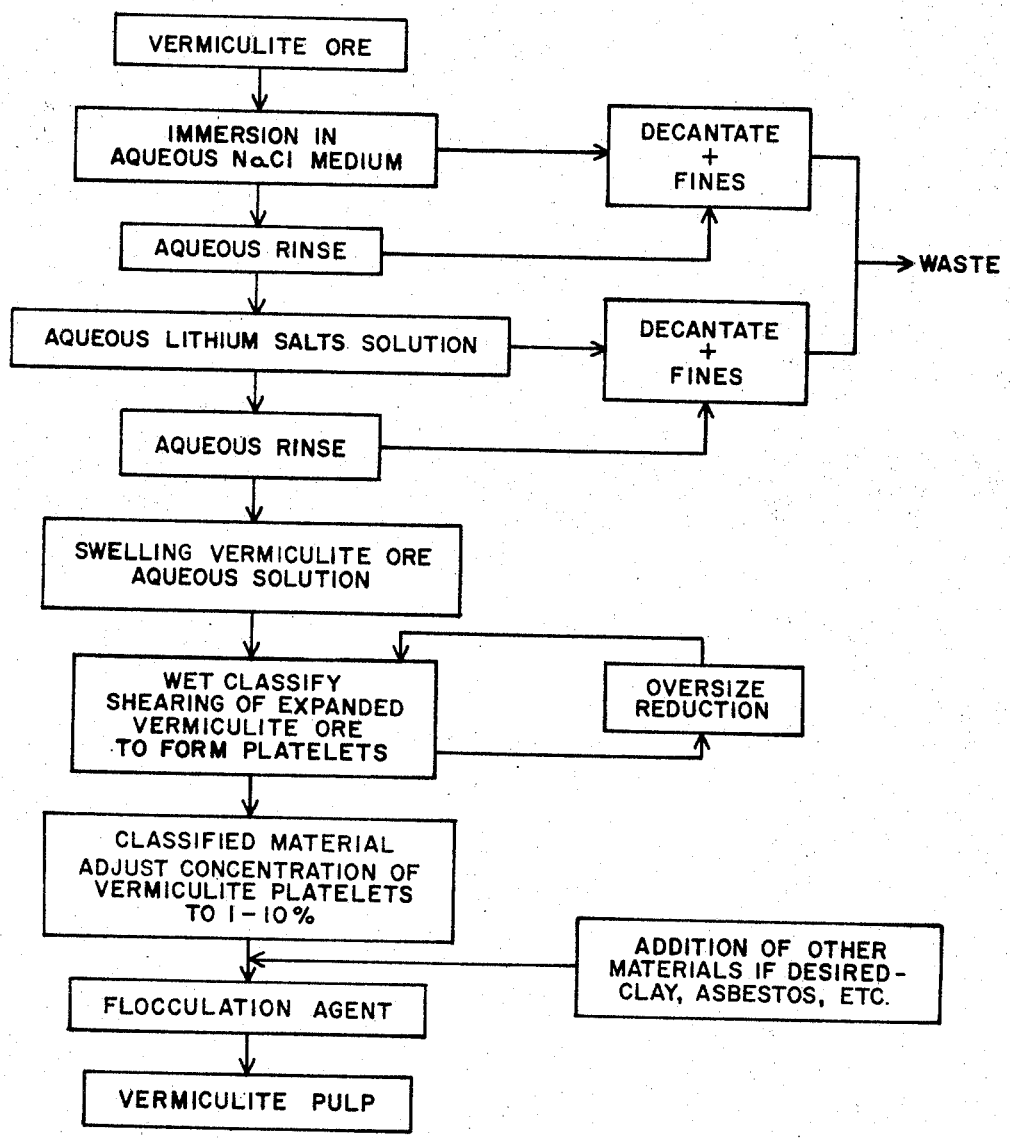

ABSTRACT OF THE DISCLOSURE

A process for preparing vermiculite paper which comprises treating vermiculite ore by immersion in sodium chloride and lithium salt solutions followed by rinses, swelling the vermiculite, shearing the expanded vermiculite ore to form platelets, classifying the material, flocculating and recovering the vermiculite pulp.

---

This invention relates to vermiculite paper. In one specific aspect it relates to a flexible paper composed of vermiculite platelets and one or more components of plate-like silicate minerals or inorganic fibers.

Specialty papers composed of mineral or organic bases are used in applications where cellulose base paper is deficient. One important use is in electronics applications where a combination of qualities such as high dielectric strength and temperature resistance are required. But these specialty papers are deficient where both flexibility and strength are necessary or desirable characteristics. This is especially true when the product must be of "paper" thinness; that is normally less than about 0.01 inch in thickness.

It is an object of this invention to provide a process for the preparation of paper and/or paper like products from inorganic materials.

It is a further object of this invention to provide strong and flexible sheet like materials derived from inorganic base substances.

These and other objects of the invention will become apparent from the following detailed description and specific examples.

Broadly, this invention contemplates preparing vermiculite paper by treating vermiculite crystals with an aqueous solution of a lithium salt, washing the treated vermiculite, subjecting the washed vermiculite to intense mechanical shearing in an aqueous solution forming a suspension of vermiculite flakes, subsequently forming a wet paper like sheet from the vermiculite flakes, and drying the sheet.

The term vermiculite used herein refers to the group of rock forming mineral species characterized by a layer latticed structure in which the silicate layer units have a thickness of approximately 10 A. The main elements present in the layer are magnesium, aluminum, silica and oxygen with the layers being separated by 1 or 2 sheets of water molecules associated with cations such as magnesium, calcium, sodium and hydrogen. The layers have considerable lateral extent relative to the thickness of basic 10 A. unit layer. The term vermiculite as used herein therefore includes minerals consisting wholly or largely of vermiculite, or minerals of a mixed-layer type containing vermiculite layers as an important constituent, such as hydrobiotites, chlorite-vermiculites, but does not include minerals of the montmorillonite group.

This invention will best be understood from a consideration of the following detailed description and specific examples.

The vermiculite is soaked in an aqueous salt solution and then washed with water. Following this the vermiculite is steeped for an extended period of time in a concentrated aqueous solution of a lithium salt. The treated vermiculite is then washed with water and allowed to stand in water with consequent swelling of vermiculite ore. The swelling or expansion of the vermiculite is many fold and takes place along the axis perpendicular to the basal plane of the mineral crystal. This is probably due to the treatment of the ore previously described in which an ion exchange takes place between the preferred monovalent or divalent cations and the exchangeable cations of the vermiculite ore, thus breaking and forming new bonds and generally weakening the binding forces holding the vermiculite platelets together. The washing and subsequent soaking of this weakened structure with water will result in osmotic swelling of the crystalline structure and allows it to be pulled apart or partially delaminated by vigorous agitation. The partially delaminated platelets may be further reduced in particle size by comminution in a colloid mill or a similar grinding-shearing apparatus, resulting in a water suspension of vermiculite platelets. At this point the total solids content of the vermiculite suspension is adjusted to approximaately 1 to 3% by weight. This suspension is then flocculated (by a suitable flocculation agent) with the resulting flock having the appearance of a wood fiber pulp. The pulp is deposited on a filter screen and the resulting deposit when dried at ambient conditions produces a flexible paper. One of the interesting qualities of this paper is that it retains its integrity and does not disintegrate or redisperse in the medium.

Referring now to the drawing, vermiculite ore is immersed in a 0.25 to 3.0 N aqueous sodium chloride solution with 1.0 N being the preferred concentration. The solution may stand at ambient temperature for a period of time but it is preferable to reflux for approximately 2 hours and then decant the liquid and fines and follow up with 3 aqueous tap water rinses. The sodium exchanged vermiculite ore is then immersed in a lithium salt solution. The type of salt depends upon the solubility desired, with lithium chloride being the preferred salt. The concentration of the lithium chloride may be on the order of from about 50 grams of lithium chloride for 500 grams of ore, up to about 250 grams of lithium chloride for 500 grams of ore. The solution is refluxed for approximately 4 hours (the solution may stand for an extended period of time as an alternate method, but reflux is the preferred method). After refluxing the excess solution is decantered along with the fines, and the ore is then washed 3 times with deionized water. Following the salt treatment, the vermiculite ore is then soaked in an excess of water, for a sufficient time to allow the ore to swell. After swelling, the ore is wet classified to the appropriate size for the end use desired, and the oversized particles are reduced and recycled. After classification, the vermiculite ore is subjected to intensive shearing to form vermiculite platelets. A grinding-shearing apparatus such as a colloid mill or Waring Blendor can be used to form the platelets. The concentration of the platelets in the water medium is adjusted to about 1 to 10%, with the preferred range being 1 to 3%. At this point, a flocculation agent is added. Various flocculation agents may be used among them are potassium hydroxide, hydrochloric acids, various inorganic salts, mineral acids and bases. The addition of the flocculation agent causes the suspended vermiculite platelets to form a pulp-like mass. This vermiculite pulp is then deposited on conventional paper making screens to form a mat. The mat may be finished according to the end use desired, by any conventional paper making technique.

Other materials may be added to the vermiculite prior to the addition of the flocculation agents to form a composite pulp. Materials such as montmorillonite clays, asbestos, organic fibers such as cellulose, and the polymeric fibers may be added. The type of material added depends upon the use or the development of particular properties for the paper. By addition of other materials to the vermiculite platelets prior to flocculation, it is possible to build in specific physical and chemical properties to the finished vermiculite paper. It is a preferred embodiment of this invention, additional component or components be added to the vermiculite platelets prior to the addition of the flocculation agents. However, this procedure may be varied depending upon the material used. This invention is illustrated, but not limited by the following specific examples.

EXAMPLE I

A 200 gram sample of No. 5 vermiculite ore was steeped for 24 hours in 260 ml. of a 20% aqueous lithium chloride solution. The treated vermiculite ore was then diluted with 500 ml. of water and centrifuged. The sedimented solids were then washed 4 times with 600 ml. portions of water. Between each of the washing and rinsing steps the solids were separated from the suspending medium by centrifugation. After the final wash, the vermiculite solids were suspended in excess water and subjected to high shear in a Waring Blendor. The concentration of the sheared vermiculite platelets was then adjusted to 1.3 weight percent by the addition of water.

150 ml. of the 1.3 percent platelet suspension was flocculated by the addition of 150 ml. of 0.3 weight percent hydrochloric acid solution.

A mat was formed from the flocculated pulp by deposition of the pulp on a filter paper which was mounted in Buchner funnel. Excess water was removed from the pulp by the application of a vacuum. The wet pulp was then placed between moist filter paper, smoothed by a roller, and subsequently air dried.

The physical properties of the vermiculite paper formed are described in Table I.

*Table I*

| | |
|---|---|
| Tensile strength | 1052 pounds per sq. in. |
| Tear resistance Rod and triangle | 16.1 grams per mil thickness. |
| Oxygen permeability | $3605 \times 10^3$ cc. per mil thickness per atmosphere per sq. meter. |
| Water permeability | 4.171 grams per mil thickness per day per sq. meter per centimeter of mercury. |
| Dielectric constant | 3.5. |
| Dissipation of electrical energy factor | 0.341. |
| Dielectric strength | 749 volts per mil thickness. |

EXAMPLE II

*Preparation of vermiculite bentonite paper*

1.3 ml. of a 1.54 weight percent aqueous solution of bentonite was added to 150 ml. of a 0.3 percent hydrochloric acid solution. 150 ml. of a vermiculite platelet suspension having a concentration of 1.26 weight percent (prepared as described in Example I) was then added. A flocculated pulp resulted which was stirred to a uniform consistency. Additional water was added to bring the volume up to 600 ml. The pulp was deposited as a mat on a Buchner funnel and vacuum dried as described in Example I. It was subsequently placed between moist filter papers, smoothed with a roller and air dried. The composition of the resulting paper was one percent bentonite and 99 percent vermiculite by weight. The composition of the final paper can be varied by adjusting the quantity of bentonite added to the vermiculite. Papers containing 5 percent and 10 percent bentonite were also prepared. The tensile strength in pounds per sq. in. of these mixed vermiculite bentonite papers is shown in Table II.

*Table II*

| Composition: | Tensile strength, pounds per sq. in. |
|---|---|
| 100% vermiculite | 1052 |
| 1.0% bentonite, 99% vermiculite | 1317 |
| 5% bentonite, 95% vermiculite | 2726 |
| 10% bentonite, 90% vermiculite | 1014 |

EXAMPLE III

*Preparation of vermiculite-cellulose paper*

A suspension of cellulose fibers was prepared by comminuting an aqueous suspension of filter paper in a Waring Blendor. The paper suspension was adjusted to a concentration of 0.54 wt. percent and 3.7 ml. of this was added to 150 ml. of a 0.3 percent hydrochloric acid solution. 150 ml. of vermiculite platelet suspension having a concentration of 1.26 wt. percent (prepared as shown in Example I) was added to the above suspension. A flocculated pulp resulted which was stirred to a uniform consistency and additional water was added to bring the final volume to 600 ml. A paper was prepared from this vermiculite cellulose pulp by the technique described in Example II. The final composition of the paper was 0.9 percent cellulose and 99.1 percent vermiculite. Other papers having a concentration of 0.9 percent cellulose, 4.4 percent cellulose, and 9.0 percent cellulose were prepared by varying the additions of cellulose to the vermiculite platelets. The tensile strengths of these papers are shown in Table III.

*Table III*

| Composition: | Tensile strength, pounds per sq. in. |
|---|---|
| 0.9% cellulose, 99% vermiculite | 1599 |
| 4.4% cellulose, 95.6% vermiculite | 1629 |
| 9.0% cellulose, 91% vermiculite | 2288 |

EXAMPLE IV

*Preparation of vermiculite-asbestos paper*

A suspension of coating asbestos was prepared by comminuting an aqueous suspension of asbestos in a Waring Blendor. The asbestos suspension was adjusted to a conc. of 1.0 percent. 20 ml. of this suspension was added to 2 ml. of a 20% hydrochloric acid solution. 140 ml. of vermiculite platelet suspension having a concentration of 1.26% wt. (prepared as shown in Example I) was added to the above suspension. A flocculated pulp resulted which was stirred to a uniform consistency and additional water was added to bring the final volume up to 600 ml. A paper was prepared with this pulp by the technique described in Example II. The final composition of the dried paper was 9 percent asbestos and 91 percent vermiculite. Other papers having a concentration of 4.8 percent asbestos, and 0.9 percent asbestos were also prepared by varying the quantity of asbestos added to the vermiculite suspension. Test results from tensile strength and gas permeability measurements are shown in Table IV.

TABLE IV

| Composition | Tensile strength (p.s.i.) | Specific oxygen permeability |
|---|---|---|
| 9.0% asbestos, 91% vermiculite | 1,225 | $3.286 \times 10^3$ |
| 4.8% asbestos, 95.2% vermiculite | 770 | $28.9 \times 10^3$ |
| 0.9% asbestos, 99.1% vermiculite | 745 | $108 \times 10^3$ |

These examples show that by the use of this invention, vermiculite papers can be successfully prepared. The results further show the composition and specific properties of the vermiculite paper can be varied by the addition of other materials, i.e., bentonite and cellulose and asbestos.

Papers prepared by this invention are fire resistant, have excellent dielectric properties, and high tensile strength, and have utility as high temperature and electrical insulation. Also being resistant to moisture disintegration, the papers are particularly useful where moisture contact is a problem.

We claim:

1. A method for the conversion of vermiculite ore into pulp suitable for conversion into sheet form by conventional paper making methods which comprises, immersing the vermiculite ore in a first solution of sodium chloride, draining and washing of excess sodium chloride solution, immersing the vermiculite ore in a second solution of lithium chloride, draining and washing of excess lithium chloride solution, immersing the said treated vermiculite ore in water to effect expansion of said vermiculite, subjecting said expanded vermiculite to intense mechanical shearing to form a suspension of vermiculite platelets and subsequently adding a flocculating agent selected from the group consisting of potassium hydroxide and hydrochloric acid.

2. A method for conversion of vermiculite ore into a pulp suitable for conversion into sheet form by conventional paper making methods, which comprises immersing the vermiculite ore in a first solution of sodium chloride, draining and washing of excess sodium chloride solution, immersing the vermiculite ore in a second solution of lithium chloride, draining and washing of excess lithium chloride solution, immersing the said treated vermiculite ore in water to effect expansion of said vermiculite, subjecting said expanded vermiculite to intense mechanical shearing to form a suspension of vermiculite platelets, adding an aqueous suspension of a material selected from the group consisting of bentonite clay, asbestos, mica, and cellulose to the said suspension of vermiculite platelets and subsequently adding a flocculating agent selected from the group consisting of potassium hydroxide and hydrochloric acid.

3. The method according to claim 2 wherein the concentration of the sodium chloride solution is from 0.25 to 3.0 normal and the concentration of the lithium chloride solution is from about 1 part of lithium chloride to 10 parts of vermiculite ore to about 1 part of lithium chloride to 1 part of vermiculite ore.

4. The method according to claim 2 wherein the concentration of the suspension of vermiculite platelets is from about 1 to 10 percent.

5. The method according to claim 2 wherein the additional material is bentonite clay.

6. The method according to claim 2 wherein the additional material is cellulose.

7. The method according to claim 2 wherein the additional material is asbestos.

8. The product prepared by the process of claim 1.

9. A method for conversion of vermiculite ore into a pulp suitable for conversion into sheet form by conventional paper making methods which comprises immersing the vermiculite ore in a first solution of sodium chloride, draining and washing to remove excess sodium chloride solution, immersing the vermiculite ore in a second solution of lithium chloride draining and washing to remove excess lithium chloride solution, immersing the said treated vermiculite ore in water to effect expansion of said vermiculite, subjecting said expanded vermiculite to intense mechanical shearing to form a suspension of vermiculite platelets, adding an aqueous suspension of a material selected from the group consisting of plate-like silicate mineral and inert fibrous material to the said suspension of vermiculite platelets and subsequently adding a flocculating agent selected from the group consisting of potassium hydroxide and hydrochloric acid.

References Cited

UNITED STATES PATENTS

| 3,001,571 | 9/1961 | Hatch | 162—152 X |
| 3,325,340 | 6/1967 | Walker | 162—3 X |

HOWARD R. CAINE, *Primary Examiner.*

U.S. Cl. X.R.

162—145, 152; 23—110, 111; 161—168